United States Patent
Sun et al.

(10) Patent No.: US 12,231,388 B2
(45) Date of Patent: Feb. 18, 2025

(54) INFORMATION SHARING CHAIN GENERATION METHOD AND APPARATUS, ELECTRONIC DEVICE, AND STORAGE MEDIUM

(71) Applicant: JINGDONG TECHNOLOGY HOLDING CO., LTD., Beijing (CN)

(72) Inventors: Guojian Sun, Beijing (CN); Yanyan Yang, Beijing (CN); Wuhuan Wu, Beijing (CN); Zhilong Feng, Beijing (CN); Boyu Qin, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 315 days.

(21) Appl. No.: 17/757,831

(22) PCT Filed: Dec. 8, 2020

(86) PCT No.: PCT/CN2020/134562
§ 371 (c)(1),
(2) Date: Jun. 22, 2022

(87) PCT Pub. No.: WO2021/129379
PCT Pub. Date: Jul. 1, 2021

(65) Prior Publication Data
US 2023/0033804 A1    Feb. 2, 2023

(30) Foreign Application Priority Data
Dec. 23, 2019 (CN) .......................... 201911335770.0

(51) Int. Cl.
*G06F 15/16* (2006.01)
*H04L 51/234* (2022.01)
*H04L 51/52* (2022.01)

(52) U.S. Cl.
CPC ............ *H04L 51/234* (2022.05); *H04L 51/52* (2022.05)

(58) Field of Classification Search
CPC ....... H04L 51/234; H04L 51/52; H04L 51/21; H04L 51/00; H04L 51/214
(Continued)

(56) References Cited

U.S. PATENT DOCUMENTS 7,203,701 B1    4/2007   Packebush et al.
10,158,558 B1   12/2018  Ward et al.
(Continued)

FOREIGN PATENT DOCUMENTS

CN    103384210 A    11/2013
CN    103605661 A    2/2014
(Continued)

OTHER PUBLICATIONS

International Search Report dated Mar. 2, 2021 of PCT International Application No. PCT/CN2020/134562.
(Continued)

*Primary Examiner* — Kaylee J Huang
(74) *Attorney, Agent, or Firm* — Qinghong Xu (57) ABSTRACT

The present disclosure relates to the technical field of computers, and disclosed therein are an information sharing chain generation method, an information sharing chain generation apparatus, an electronic device, and a computer readable storage medium. The method comprises: in response to shared information being shared among a plurality of nodes, acquiring information of a parent node of a target node, wherein the parent node of the target node is a node that shares the shared information to the target node; according to the information of the parent node of the target node, searching for the parent node of the target node in a pre-established information sharing data table, and sequen-
(Continued)

---

S110: In response to shared information being shared among a plurality of nodes, acquire information of a parent node of a target node, wherein the parent node of the target node is a node that shares the shared information to the target node S120: According to the information of the parent node of the target node, search for the parent node of the target node in a pre-established information sharing data table, and sequentially search for information of a previous parent node by taking the searched parent node as a child node S130: Generate a sharing chain of the shared information based on search results tially searching for information of a previous parent node by taking the searched parent node as a child node; and generating a sharing chain of the shared information based on search results.

17 Claims, 7 Drawing Sheets

(58) Field of Classification Search
USPC .......................................... 709/206, 204, 205
See application file for complete search history.

(56) References Cited

U.S. PATENT DOCUMENTS

| | | | | |
|---|---|---|---|---|
| 2005/0289150 | A1* | 12/2005 | Kudo | G06F 21/604 |
| 2006/0041577 | A1* | 2/2006 | Ellicott | G06F 7/36 |
| | | | | 707/999.102 |
| 2010/0312817 | A1* | 12/2010 | Steakley | G06F 8/61 |
| | | | | 709/202 |
| 2013/0311327 | A1 | 11/2013 | Tehrani et al. | |
| 2014/0101134 | A1* | 4/2014 | Bohrer | G06Q 30/02 |
| | | | | 707/E17.014 |
| 2015/0254371 | A1* | 9/2015 | Zhang | H04L 67/306 |
| | | | | 707/798 |
| 2017/0286558 | A1* | 10/2017 | Kelleher | G06F 11/323 |

FOREIGN PATENT DOCUMENTS

| | | | |
|---|---|---|---|
| CN | 104778210 | A | 7/2015 |
| CN | 105069003 | A | 11/2015 |
| CN | 106157155 | A | 11/2016 |
| CN | 106503230 | A | 3/2017 |
| CN | 107222381 | A | 9/2017 |
| CN | 107274221 | A | 10/2017 |
| CN | 107730205 | A | 2/2018 |
| CN | 108268521 | A | 7/2018 |
| CN | 110912809 | A | 3/2020 |

OTHER PUBLICATIONS

The First Office Action dated Feb. 10, 2021 of Chinese Patent No. 201911335770.0.
The Notice of Allowance dated Jun. 29, 2021 of Chinese Patent No. 201911335770.0.
Extended European Search Report dated Nov. 3, 2023 of Europe Application No. 20905783.5.

* cited by examiner

INFORMATION SHARING CHAIN GENERATION METHOD AND APPARATUS, ELECTRONIC DEVICE, AND STORAGE MEDIUM

CROSS-REFERENCE TO RELATED APPLICATIONS

The present application the U.S. national phase application of International Application No. PCT/CN2020/134562, filed on Dec. 8, 2020, which claims priority to Chinese Patent Application No. 201911335770.0, filed with the Chinese Patent Office on Dec. 23, 2019, entitled 'Information Sharing Chain Generation Method and Apparatus, Electronic Device, and Storage Medium', entirety of which are incorporated herein by reference.

TECHNICAL FIELD

The present disclosure relates to the field of computer technology, and in particular, to an information sharing chain generation method, an information sharing chain generation apparatus, an electronic device and a computer readable storage medium.

BACKGROUND

With the development of computer technology, the transmission methods of information on the Internet are becoming more and more diverse. Forwarding and sharing information has become one of the main ways for users to communicate and exchange information. However, in the process of realizing generating a sharing chain, it is found that when the information is shared and transmitted among multiple users, the information cannot be reasonably traced to the sharing nodes, which makes it difficult to effectively evaluate the shared information according to the user behavior of each sharing node.

Therefore, how to efficiently and accurately generate an information sharing chain is an urgent problem to be solved in the prior art.

It should be noted that the information disclosed in the background section above is merely for enhancement of understanding of the background of the present disclosure, and thus may include information that does not constitute prior art known to one of ordinary skill in the art.

SUMMARY

According to an aspect of the present disclosure, there is provided an information sharing chain generation method. The information sharing chain generation method may include: in response to shared information being shared among a plurality of nodes, acquiring information of a parent node of a target node, wherein the parent node of the target node is a node that shares the shared information to the target node; according to the information of the parent node of the target node, searching for the parent node of the target node in a pre-established information sharing data table, and sequentially searching for information of a previous parent node by taking the searched parent node as a child node; and generating a sharing chain of the shared information based on search results.

In some embodiments of the disclosure, before acquiring the information of the parent node of the target node, the method further includes in response to that the target node triggers a preset event according to the shared information, performing the step of acquiring the information of the parent node of the target node.

In some embodiments of the disclosure, the preset event comprises any one or more of: a time of the target node browsing the shared information exceeds a preset time; a specific interactive operation is performed by the target node on the shared information; a frequency of the target node viewing the shared information exceeds a preset threshold; and a number of other nodes to which the target node shares the shared information is greater than a preset number.

In some embodiments of the disclosure, the information sharing data table is established in following manner: in response to that the shared information arrives at each node, taking a node at which the shared information arrives as a current node, and recording a node identification of the current node, a node sharing code of the current node, a parent node identification of the current node, a parent node sharing code of the current node and an identification of the shared information; and generating the information sharing data table based on the node identification of the each node, the node sharing code of the each node, the parent node identification of the each node, the parent node sharing code of the each node and the identification of the shared information.

In some embodiments of the disclosure, the recording the node identification of the current node, the node sharing code of the current node, the parent node identification of the current node, the parent node sharing code of the current node and the identification of the shared information may include: searching for the node identification of a previous node of the current node and treating the node identification of the previous node as the parent node identification of the current node; searching for the node sharing code of the previous node of the current node and treating the node sharing code of the previous node as the parent node sharing code of the current node; and obtaining the node sharing code of the current node by adding one to the parent node sharing code of the current node.

In some embodiments of the disclosure, the acquiring the information of the parent node of the target node includes acquiring the parent node identification of the target node, the parent node sharing code of the target node and the identification of the shared information; the according to the information of the parent node of the target node, searching for the parent node of the target node in the pre-established information sharing data table, and sequentially searching for information of the previous parent node by taking the searched parent node as the child node may include: according to the identification of the shared information, searching for sharing record information of the shared information in the information sharing data table; according to the parent node identification of the target node and the parent node sharing code of the target node, searching for the parent node of the target node in the sharing record information of the shared information, wherein the parent node identification of the target node is same as the node identification of the parent node, and the parent node sharing code of the target node is same as the node sharing code of the parent node; and in response to that the parent node of the target node is searched, treating the parent node as the child node, and sequentially continuing to search for information of the previous parent node by taking the searched parent node as the child node.

In some embodiments of the disclosure, the generating the sharing chain of the shared information based on search results may include: in response to that the information of the searched previous parent node is a null value, generating the sharing chain of the target information according to the target node and a relationship between each of the searched child nodes and a corresponding parent node.

In some embodiments of the disclosure, after generating the sharing chain of the shared information, the method further includes: according to an attribute of the sharing chain, sending service information corresponding to the attribute to a plurality of nodes in the sharing chain.

According to an aspect of the present disclosure, there is provided an electronic device. The electronic device may include a processor; and a memory for storing executable instructions for the processor; wherein the processor is configured to: in response to shared information being shared among a plurality of nodes, acquire information of a parent node of a target node, wherein the parent node of the target node is a node that shares the shared information to the target node; according to the information of the parent node of the target node, search for the parent node of the target node in a pre-established information sharing data table, and sequentially search for information of a previous parent node by taking the searched parent node as a child node; and generate a sharing chain of the shared information based on search results.

According to an aspect of the present disclosure, there is provided a computer-readable storage medium having a computer program stored thereon, wherein, when the computer program is executed by a processor, an information sharing chain generation method is implemented. The information sharing chain generation method may include in response to shared information being shared among a plurality of nodes, acquiring information of a parent node of a target node, wherein the parent node of the target node is a node that shares the shared information to the target node; according to the information of the parent node of the target node, searching for the parent node of the target node in a pre-established information sharing data table, and sequentially searching for information of a previous parent node by taking the searched parent node as a child node; and generating a sharing chain of the shared information based on search results.

BRIEF DESCRIPTION OF THE DRAWINGS

The accompanying drawings, which are incorporated in and constitute a part of this specification, illustrate embodiments consistent with the disclosure and together with the specification serve to explain the principles of the disclosure. Obviously, the drawings in the following description are only some embodiments of the present disclosure, and for those of ordinary skill in the art, other drawings can also be obtained from these drawings without creative effort.

DETAILED DESCRIPTION

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments.

The present disclosure provides an information sharing chain generation method, an information sharing chain generation apparatus, an electronic device and a computer-readable storage medium, thereby at least to a certain extent overcoming the inability of the prior art to effectively trace the sharing nodes in the information sharing process to generate information sharing chains.

Exemplary embodiments of the present disclosure first provide an information sharing chain generation method, wherein the information may be commodity information in an E-Commerce Application, such as a commodity title, a link to a commodity, or a commodity QR code picture, etc., may be user information in social applications, such as user business cards, or may be game information in game applications, which are not specifically limited in this disclosure. The application scenarios of the method in this embodiment may be: when a user pushes commodity information to other users, determining the user chain of the commodity in the entire sharing process; or when a player shares game information with other players, determining the player chain of the game to which the game information is shared, etc., to evaluate and analyze the shared information according to the generated information sharing chains.

Figure 1:
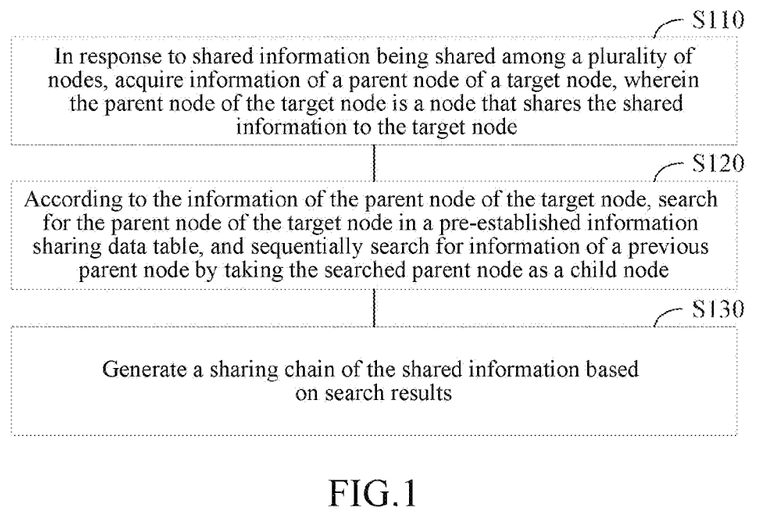
FIG. 1 schematically shows a flowchart of an information sharing chain generation method in some embodiments.

The present exemplary embodiment is further described below with reference to FIG. 1. As shown in FIG. 1, the information sharing chain generation method may include the following steps S110-S130.

At step S110, in response to shared information being shared among a plurality of nodes, information of a parent node of a target node is acquired, and the parent node of the target node is a node that shares the shared information to the target node.

The shared information refers to information that can be transmitted and shared among multiple users, such as commodity links, commodity pictures, commodity QR codes, game links, or user business cards, and so on. The shared information can be information that shared among multiple nodes. For example, user A can share the link of commodity 1 to user B, and user B can share the link of commodity 1 with user C after receiving it from user A, so that the link of commodity 1 can be shared with user A, B, and C. The target node refers to a certain node among multiple nodes that share information. Through the analysis of the target node, a sharing path for shared information can be determined. All nodes involved in this exemplary embodiment may be terminal devices related to the sharer or the share (i.e., the user being shared), such as a smart phone, a tablet computer, a personal computer, and so on. The parent node is the node that shares the shared information to the target node. For example, in the above sharing example, if the terminal device associated with user B is used as the target node, the terminal device associated with user A is the parent node of the terminal device associated with user B. If the terminal device associated with user C is used as the target node, the terminal device associated with user B is the parent node of user C. In this exemplary embodiment, the parent node may include various information related to the parent node itself, such as an identification code of the parent node, a sharing code of the parent node, and the like.

It should be noted that the target node may be any node among multiple nodes, or may be a node that satisfies a preset condition. In an exemplary embodiment, before acquiring the information of the parent node of the target node, the information sharing chain generation method may further include: if the target node triggers a preset event according to the shared information, the step of acquiring the information of the parent node of the target node is performed.

The preset event is the condition for judging which node among the multiple nodes is the target node. In this exemplary embodiment, by setting the judgment mechanism, a target node can be selected from multiple nodes, and the target node can be used as an end node of the information sharing chain, and the entire information sharing chain can be determined by tracing upwards from the end node.

The preset event may include any one or more of the following situations: (1) a time of the target node browsing the shared information exceeds a preset time; (2) the target node performs a specific interactive operation on the shared information; (3) a frequency of the target node viewing the shared information exceeds a preset threshold; and (4) the number of other nodes to which the target node shares the shared information is greater than a preset number.

When generating the information sharing chain, it is first necessary to determine from which node to trace upwards to find other nodes in the information sharing process, and how to determine this end node is very important, that is, how to determine the target node. Considering that if a certain node performs some special operations on the shared information, the effectiveness of the information sharing chain in subsequent applications can be improved, this exemplary embodiment sets any one or more of the above (1) to (4) as the preset event. During the sharing process, when a certain node performs the above-mentioned preset event on the shared information, the node can be determined as the target node. Specifically, when the shared information is more important, usually users will view it multiple times or browse it for a long time, so the above preset events (1) and (3) can be set, wherein the preset time and preset threshold can be customized settings, which are made as required, which is not specifically limited in the present disclosure. In addition, in case (2), the specific interactive operation refers to that the user corresponding to the node performs some special operations on the shared information. For example, when the shared information is a link to a commodity, the user opens the link and performs operations on the commodity, such as additional purchases, collection and purchase, which can be considered as specific interactive operations; or when the shared information is a user name card, the user corresponding to the node can perform operations based on the user name card, such as taking screenshots, saving pictures, adding friends and other operations, which can also be considered as the specific operation interactions. However, when the shared information is more important to the shared user or preferred by the shared user, it may be shared with other users in large quantities. Therefore, when the number of shared users exceeds the preset threshold, the node can be used as a target node, etc.

At step S120, a parent node of the target node is searched in a pre-established information sharing data table based on information of the parent node of the target node, and is treated as a child node sequentially to search for information of a previous parent node.

Wherein, the information sharing data table refers to a data table used to store information that is associated with each sharing node during the information sharing process, which may include identification information of each node, or specific shared information, such as identity identification (ID) of the node, the type of shared information or the specific content of the shared information, etc. By using the information of the parent node of the target node obtained in step S110, the parent node of the target node can be searched in the data table, and then continue to trace upwards according to the information of the parent node, so a reverse path of the forward sharing process for the shared information can be found, that is the information sharing chain.

In an exemplary embodiment, the above-mentioned information sharing data table is established in the following manner: in response to that the shared information arrives each node, taking a node at which the shared information arrived as a current node, and recording a node identification of the current node, a node sharing code of the current node, a parent node identification of the current node, a parent node sharing code of the current node and an identification of the shared information; generating the information sharing data table based on the node identification, the node sharing code, the parent node identification, the parent node sharing code of each node and the identification of the shared information.

The node identification may be information that can reflect which node the current node is, such as ID information of the node, and each node has a unique identification that is different from other nodes. In this exemplary embodiment, according to different application scenarios, the identification of the node may have various representation methods. For example, in the case of the terminal held by the user being treated as a node, the node may be the ID, code or coordinate of the user terminal. The node sharing code can be used in the sharing process to mark all the nodes with serial numbers. The identification of the shared information refers to the information used to indicate which object is being shared. It can have different identification form according to the different objects to be shared. The form can be in text form, such as a commodity link, a commodity description, or a commodity serial number, etc. The form can also be in image form, such as commodity screenshots or commodity QR codes, etc.

In an exemplary embodiment, the above-mentioned recording the node identification of the current node, the node sharing code of the current node, the parent node identification of the current node, the parent node sharing code of the current node and the identification of the shared information may include the following steps: searching for the node identification of a previous node of the current node and treating the node identification of the previous node as the parent node identification of the current node; searching for the node sharing code of the previous node of the current node and treating the node sharing code of the previous node as the parent node sharing code of the current node; and obtaining the node sharing code of the current node by adding one to the parent node sharing code of the current node.

Table 1 schematically shows an information sharing data table in this exemplary embodiment, wherein SId represents the identification of each sharing node, SLinkId represents the sharing code of each sharing node, PId represents the parent node identification, PLinkId represents the parent node sharing code, and ItemCode represents the identification of the shared information:

TABLE 1

| SId | PId  | ItemCode | PlinkId | SLinkId |
|-----|------|----------|---------|---------|
| S1  | Null | 1001     | Null    | 1       |
| S2  | S1   | 1001     | 1       | 2       |
| S3  | S2   | 1001     | 2       | 3       |
| S4  | S3   | 1001     | 3       | 4       |
| S3  | S1   | 1001     | 1       | 5       |
| S6  | S3   | 1001     | 5       | 6       |
| S5  | S6   | 1001     | 6       | 7       |

The establishment process of the information sharing data table can be as follows: when each sharing node performs the sharing operation, it can call the background interface to generate a unique identification and sharing code for said node, and store it in the database, and the parent node identification and the parent node sharing code of each node can be determined by the identification and sharing code of a child node of the parent node. For example, in the above example, in response to determining that the shared information arrives the sharing node S1, generating a unique identification 'S1' and a unique sharing code '1', as well as the identification '1001' of the shared information and storing them in the database; in response to determining that the shared information arrives the S2 node, generating a unique identification 'S2', transmitting the identification '1001' of the recorded shared information, searching the node identification 'S1' of the parent node of the current node S2 and treating the node identification 'S1' of the parent node of the current node S2 as the parent node identification of the current node S2, and obtaining the sharing code '2' of the current node S2 by adding 1 to the sharing code '1' of the parent node S1, and then storing the unique identification 'S1' and the sharing code '1' of the parent node S1 of the current node S2 in the database, and so on, so as to create the information sharing data table in the database. Based on the information sharing data table established by the method of this exemplary embodiment, it can be seen from Table 1 that although node S3 is both the parent node of node S4 and the parent node of node S6, the parent node sharing code of node S4 is different from the parent node sharing code of node S6 in the information sharing data table, indicating that although the information sharing to these two nodes passes through node S3, the two paths are quite different. This exemplary embodiment can extract the exact path for information sharing from the information sharing data table by recording the node identification, the node sharing code, the parent node identification, the parent node sharing code of each node to which the information arrives and identification of the shared information during the information sharing process.

It should be noted that, in this exemplary embodiment, including but not limited to using databases such as redis, mysql, etc., which is not specifically limited in the present disclosure.

At step S130, a sharing chain of shared information is generated according to search results.

The search results refers to some or all of the shared nodes found on the same sharing path, including the target node. According to the found part or all of the shared nodes, the sharing chain in the present embodiment can be generated. In this exemplary embodiment, a length of the chain of shared information in the sharing process can be determined as needed, that is, the shared information itself can be used as a starting node of the sharing chain, or a first-level sharing node can be used as the starting node of the sharing chain. Furthermore, any sharing node in the sharing process can be treated as the starting node of the sharing chain, etc. For example, the sharing process is from S1 to S10. If S9 is the target node, multiple sharing chains such as S1 to S9, S2 to S9, . . . , S8 to S9 can be determined.

In this exemplary embodiment, after a sharing chain for shared information is generated, the sharing chain can be pushed to service terminals in other application scenarios as needed. For example, after a social sharing chain is generated, the social sharing chain can be pushed to service terminals and the like, so as to analyze and evaluate the social relationships. It is also possible to push the required services to all or some nodes in the sharing chain, for example, after generating a social sharing chain, other interested users are pushed to each node in the sharing chain, etc., which is not specifically limited in this disclosure.

Figure 2:
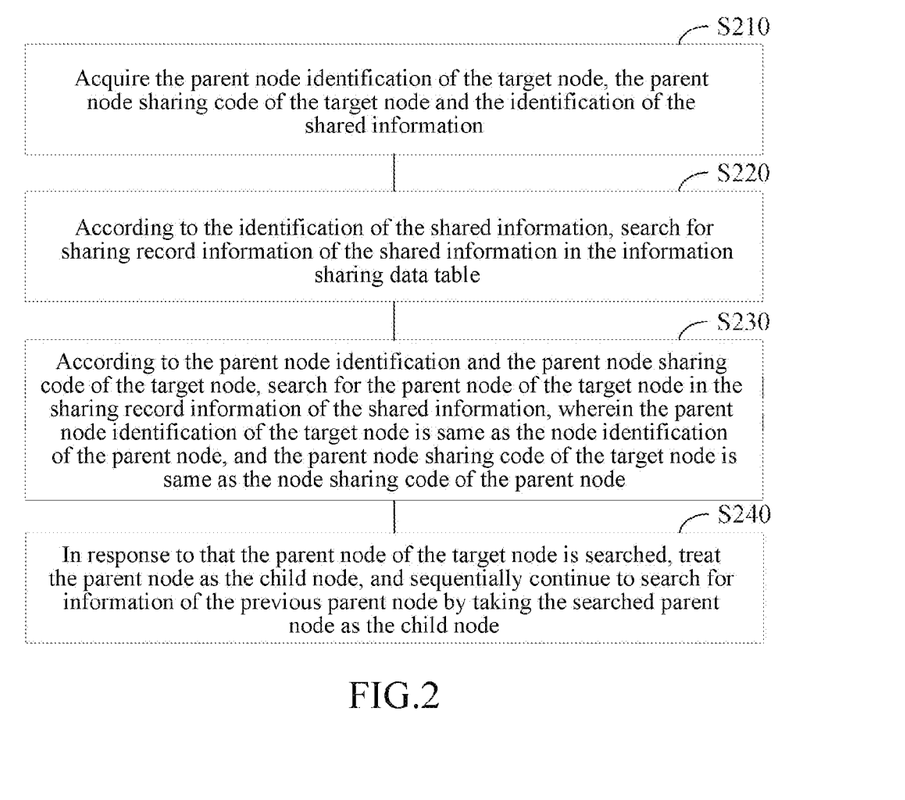
FIG. 2 schematically shows a sub-flow diagram of an information sharing chain generation method in some embodiments.

In some embodiments, the step S110 of acquiring information of the parent node of the target node may include step S210.

At step S210, the parent node identification of the target node, the parent node sharing code of the target node and the identification of the shared information are required.

Further, step S120 may include the following steps S220-S240.

At step S220, sharing record information of the shared information is searched in the information sharing data table, according to the identification of the shared information.

At step S230, in the sharing record information of the shared information, the parent node of the target node is searched according to the parent node identification of the target node and the parent node sharing code of the target node, wherein the parent node identification of the target node is the same as the node identification of the parent node, and the parent node sharing code of the target node is the same as the node sharing code of the parent node.

At step S240, after searching for the parent node of the target node, the parent node is took as a child node, and information of a previous parent node is searched or found sequentially by taking the searched parent node as the child node.

Figure 3:
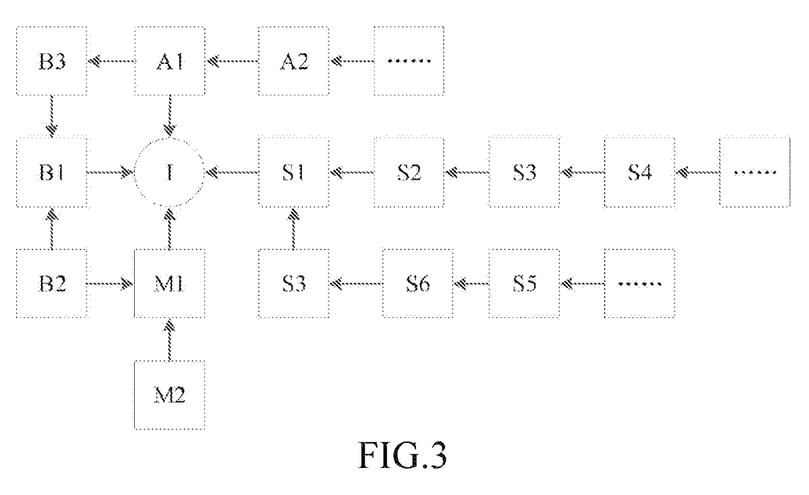
FIG. 3 schematically shows a schematic diagram of an information sharing process in some embodiments.

In this exemplary embodiment, in order to generate the sharing chain for shared information, after determining the target node, the parent node identification of the target node, parent node sharing code of the target node, and identification of the shared information may be obtained. The identification of the shared information can determine whether the nodes that share the information are in the same sharing process, that is, whether each sharing node shares the same shared information. Considering that, in the actual sharing process, there may be situations where the same shared information is shared by different parent sharing nodes to the same child sharing node, or the same shared information is shared with different child sharing nodes. FIG. 3 shows the schematic diagram of the information sharing process, wherein 'I' represents shared information, S1~S6, A1·A2, B1~B3, M1~M2 represent the nodes that share the shared information. According to the sharing relationship in the FIG. 3, The sharing chains for shared information can include 'S1-S2-S3-S4- . . . ', 'S1-S3-S6-S5- . . . ', 'A1-A2-M1-M2- . . . ', etc. Among them, it can be seen that node S3 shares information with both S4 and S6, and node S3 is both a child node of node S2 and a child node of node S1.

Therefore, in this exemplary embodiment, the sharing record information can be found in the information sharing data table through the identification of the shared information, and the parent node identification and parent node sharing code of each node can be obtained from sharing record information of the shared information. That is, sharing nodes in the same information sharing process are determined, and the parent node of the target node is searched to accurately determine the unique chain for shared information.

In conjunction with above-mentioned Table 1, for example, taking the node S5 as the target node, an object shared by the sharing chain is determined according to the identification '1001' of the shared information, and a parent node identification S6 of node S5 and a parent node sharing code 6 of node S5 are obtained; after determining the parent node S6, a parent node identification S3 of node S6 and a parent node sharing code 5 of node S6 are obtained; after determining the parent node S3, a parent node identification S1 of node S3 and a parent node sharing code 1 of node S3 are obtained; then a sharing chain of 'S1-S3-S6-S5' is determined. For example, taking the node S4 as the target node, a parent node identification S3 of node S4 and a parent node sharing code 3 of node S4 are obtained; after determining the parent node S3, a parent node identification S2 of node S3 and a parent node sharing code 2 of node S3 are obtained; after determining the parent node S2, a parent node identification S1 of node S2 and a parent node sharing code 1 of node S2 are obtained; then a sharing chain of 'S1-S2-S3-S4' is determined. Among them, it can be seen that although node S6 and node S4 have the same parent node S3, they are node S3 with different sharing codes, so two different sharing chains can be generated.

In some embodiments, the above step S130 may include when the information of the found or searched previous parent node is a null value, a sharing chain of the target information is generated according to relationships between the target node and the parent node and between each searched child node and its parent node.

In this exemplary embodiment, when the information of the found previous parent node is the null value, it can be considered that in the current sharing path for information sharing, the starting node for sharing has been arrived, such as the shared information itself, or a first-level sharing node, etc. Therefore, the starting node of the sharing chain can be determined. According to the relationship between the found target node and the parent node thereof, and the relationship between each found child node and parent node thereof, that is, the relationship between each node and the previous node, the sharing chain of the target information is generated.

By in response to shared information being shared among multiple nodes, obtaining information of the parent node of the target node, and the parent node of the target node being the node that shares the shared information to the target node; according to the information of the parent node of the target node, searching for a parent node of the target node in a pre-established information sharing data table, and sequentially searching for information of a previous parent node by taking the searched parent node as a child node; and then generating a sharing chain for shared information according to search results, on the one hand, the embodiments of the present disclosure propose a new method for generating an information sharing chain, which traces other nodes associated with the shared information by obtaining information of the parent node of the target node and generates the information sharing chain, and the process of generating the information sharing chain depends on the information of the parent node, so that the generated information sharing chain has high accuracy. In addition, the complexity of the generation algorithm of the information sharing chain in this exemplary embodiment is relatively low, the generation process is relatively simple, and the process does not require high resource costs and has high efficiency of generating information sharing chain.

In some embodiments, after generating the sharing chain for shared information, the information sharing chain generation method may further include: according to an attribute of the sharing chain, service information corresponding to the attribute is sent to multiple nodes in the sharing chain.

In this exemplary embodiment, in different application scenarios, sharing chains with different attributes can be generated, such as, a sharing chain generated based on commodity information, a sharing chain generated based on game information, etc. Based on this, different service information can be pushed to respective nodes in the sharing chain, according to different attributes of the sharing chain. For example, after generating a sharing chain of a social relationship, social services, such as friend pushing, chat service, etc. can be pushed to each node in the sharing chain; after generating a sharing chain of an e-commerce relationship, commodities information or commodity-related services, such as commodity insurance services, etc. are pushed to each node in the sharing chain; after generating a sharing chain of a game relationship, game-related information, such as new gameplay or new activities in the game, can be pushed to each node of the sharing chain.

Figure 4:
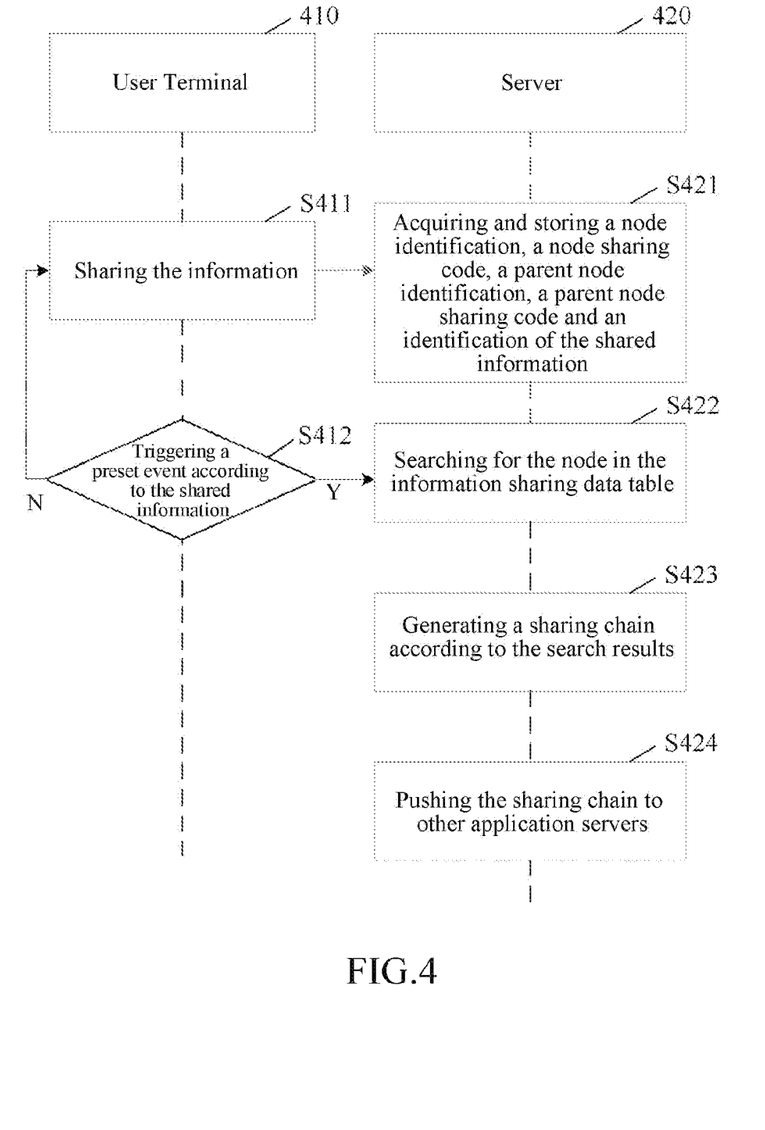
FIG. 4 schematically shows a flowchart of another information sharing chain generation method in some embodiments.

FIG. 4 shows an interactive flowchart of information sharing chain generation method according to some embodiments. The method may specifically include the following steps: the user terminal 410 may be provided with a client or a small program for sharing, and step S411 is executed to share information. Different nodes may have different user terminals, this is only a schematic illustration, and the number of user terminals is not limited. The server 420 executes step S421, which includes in response to each node shares the information, acquiring a node identification, a node sharing code, a parent node identification, a parent node sharing code of each node and an identification of the shared information, and storing the node identification, the node sharing code, the parent node identification, the parent node sharing code of each node and the identification of the shared information in an information sharing data table. Furthermore, step S412 is performed at the user terminal 410 to determine whether the user terminal triggers a preset event according to the shared information. If the target node does not trigger the preset event, the user terminal 410 continues to share the information, and store information of each node and shared information in the information sharing data table. If the target node triggers the preset event, step S422 is performed at the server 420, which includes according to the information of the parent node of the target node, searching for the parent node of the target node in a pre-established information sharing data table, and sequentially searching for information of a previous parent node by taking the searched parent node as a child node; and then step S423 is performed to generate a sharing chain of shared information according to the search results. After each sharing chain is generated, step S424 may be performed on the server 420 to push the sharing chain to other application servers.

Exemplary embodiments of the present disclosure have the following beneficial effects.

By in response to shared information being shared among multiple nodes, obtaining information of the parent node of the target node, and the parent node of the target node being the node that shares the shared information to the target node; according to the information of the parent node of the target node, searching for a parent node of the target node in a pre-established information sharing data table, and sequentially searching for information of a previous parent node by taking the searched parent node as a child node; and then generating a sharing chain for shared information according to search results, on the one hand, the embodiments of the present disclosure propose a new method for generating an information sharing chain, which traces other nodes associated with the shared information by obtaining information of the parent node of the target node and generates the information sharing chain, and the process of generating the information sharing chain depends on the information of the parent node, so that the generated information sharing chain has high accuracy. In addition, the complexity of the generation algorithm of the information sharing chain in this exemplary embodiment is relatively low, the generation process is relatively simple, and the process does not require high resource costs and has high efficiency of generating information sharing chain.

Figure 5:
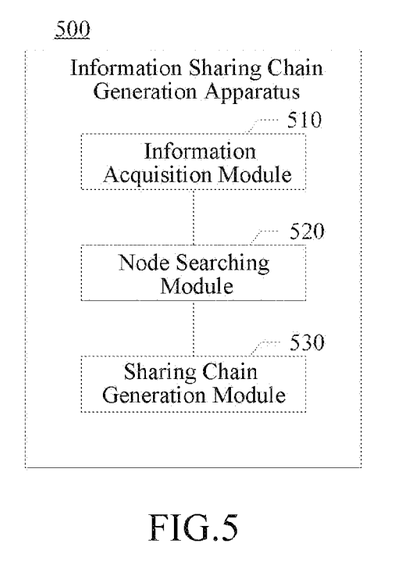
FIG. 5 schematically shows a structural block diagram of an information sharing chain generation apparatus in some embodiments.

Exemplary embodiments of the present disclosure also provide an information sharing chain generation apparatus 500. The apparatus 500 may include an information acquisition module 510, a node searching module 520 and a sharing chain generation module 530. The information acquisition module 510 is used to acquire information of a parent node of a target node in response to shared information being shared among a plurality of nodes, wherein the parent node of the target node is a node that shares the shared information to the target node. The node searching module 520 is used to, according to the information of the parent node of the target node, search for the parent node of the target node in a pre-established information sharing data table, and sequentially search for information of a previous parent node by taking the searched parent node as a child node. The sharing chain generation module 530 is used to generate a sharing chain of shared information according to search results.

In an exemplary embodiment, the information sharing chain generation apparatus 500 may further include a judging unit, which is used to, before acquiring the information of the parent node of the target node, in response to that the target node triggers a preset event according to the shared information, perform the step of acquiring the information of the parent node of the target node.

In an exemplary embodiment, the preset event may include any one or more of the following situations: a time of the target node browsing the shared information exceeds a preset time; a specific interactive operation is performed by the target node on the shared information; a frequency of the target node viewing the shared information exceeds a preset threshold; and a number of other nodes to which the target node shares the shared information is greater than a preset number.

In an exemplary embodiment, the information sharing data table can be established in the following manner, the information sharing chain generation apparatus 500 further includes an information recording unit, which is used to, in response to that the shared information arrives at each node, take a node at which the shared information arrives as a current node, and record a node identification of the current node, a node sharing code of the current node, a parent node identification of the current node, a parent node sharing code of the current node and an identification of the shared information; and a data table generation unit configured to generate the information sharing data table based on the node identification of the each node, the node sharing code of the each node, the parent node identification of the each node, the parent node sharing code of the each node and the identification of the shared information.

In an exemplary embodiment, the information recording unit may include: a first searching subunit, used for searching for the node identification of a previous node of the current node and treating the node identification of the previous node as the parent node identification of the current node; a second searching subunit, used for searching for the node sharing code of the previous node of the current node and treating the node sharing code of the previous node as the parent node sharing code of the current node; and a node sharing code generation subunit, used for obtaining the node sharing code of the current node by adding one to the parent node sharing code of the current node.

In an exemplary embodiment, the information acquisition module may include: an information acquisition unit, configured to, in response to shared information being shared among a plurality of nodes, acquire the parent node identification of the target node, the parent node sharing code of the target node and the identification of the shared information. The node searching module includes: an information searching unit, configured to, according to the identification of the shared information, search for sharing record information of the shared information in the information sharing data table; a parent node determining unit, configured to, according to the parent node identification of the target node and the parent node sharing code of the target node, search for the parent node of the target node in the sharing record information of the shared information, wherein the parent node identification of the target node is same as the node identification of the parent node, and the parent node sharing code of the target node is same as the node sharing code of the parent node; a sequential searching unit, configured to, after searching for the parent node of the target node, treat the parent node as the child node, and sequentially continue to search for information of the previous parent node by taking the searched parent node as the child node.

In an exemplary embodiment, the sharing chain generation module may include: a sharing chain generation unit, configured to, in response to that the information of the searched previous parent node is a null value, generate the sharing chain of the target information according to the target node and a relationship between each of the searched child nodes and a corresponding parent node.

In an exemplary embodiment, the information sharing chain generation apparatus may further include: an information pushing module, configured to, after generating the sharing chain for shared information, send service information corresponding to the attribute to a plurality of nodes in the sharing chain, according to an attribute of the sharing chain.

The specific details of respective modules/units mentioned above have been described in detail in embodiments of the corresponding method parts, and the undisclosed details can be referred to the content of the embodiments of the corresponding method part, and thus will not be repeated here.

In an exemplary embodiment of the present disclosure, there is provided an electronic device capable of implementing the above method.

Those skilled in the art may understand that various aspects of the present disclosure may be implemented as a system, method, or program product. Therefore, various aspects of the present disclosure may be embodied in the following forms, i.e. a complete hardware implementation, a complete software implementation (including firmware, microcode, etc.), or a combination of hardware and software, which may be collectively referred to herein 'circuit', 'module', or 'system'.

The electronic device 600 according to this embodiment of the present disclosure is described below with reference to FIG. 6. The electronic device 600 shown in FIG. 6 is merely an example, and should not impose any limitation on the functions and scope of use of the embodiment of the present disclosure.

Figure 6:
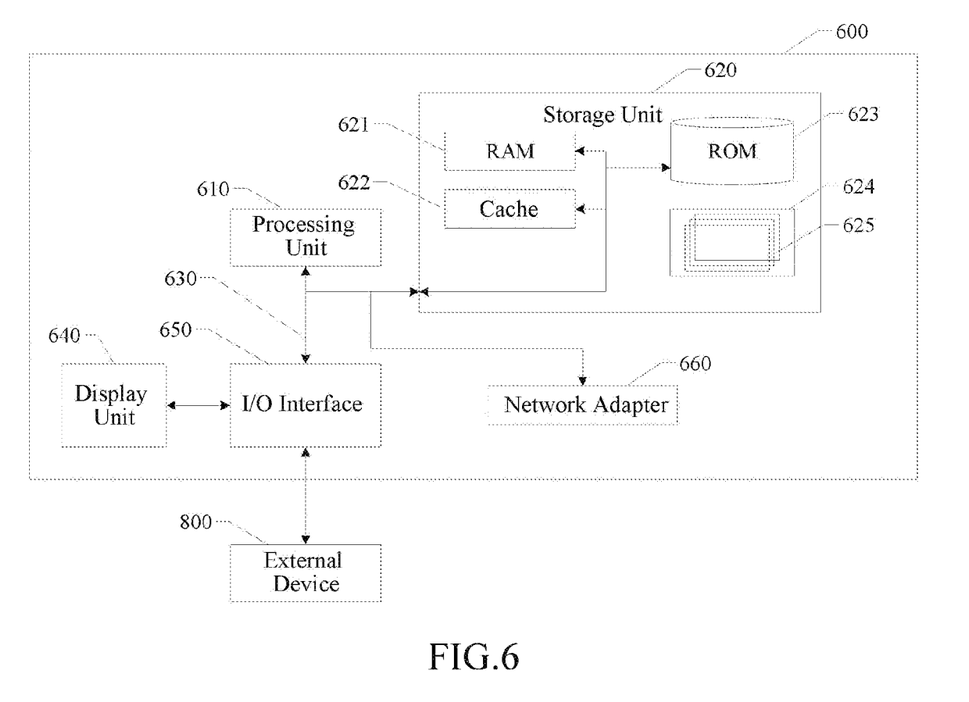
FIG. 6 schematically shows an electronic device for implementing the above method in some embodiments.

As shown in FIG. 6, the electronic device 600 is expressed in the form of a general-purpose computing device. The components of the electronic device 600 may include, but are not limited to, at least one processing unit 610, at least one storage unit 620, a bus 630 connecting different system components (including the storage unit 620 and the processing unit 610) and a display unit 640.

The storage unit stores program code, and the program code may be executed by the processing unit 610, so that the processing unit 610 executes various steps of the exemplary embodiments according to the present disclosure described in the above-mentioned 'exemplary method' in the specification. For example, the processing unit 610 may execute steps S110 to S130 shown in FIG. 1, and may also execute steps S210 to S240 shown in FIG. 2, etc.

The storage unit 620 may include a readable medium in the form of a volatile storage unit, such as a random access storage unit (RAM) 621 and/or a cache storage unit 622, and may further include a read-only storage unit (ROM) 623.

The storage unit 620 may further include a program/utility tool 624 having a set of (at least one) program modules 625. Such program modules 625 include, but are not limited to, an operating system, one or more application programs, other program modules, and program data. Each or some combination of these examples may include an implementation of a network environment.

The bus 630 may be one or more of several types of bus structures, comprising a storage unit bus or a storage unit controller, a peripheral bus, a graphics acceleration port, a processing unit, or a local bus that uses any of the bus structures in a variety of bus structures.

The electronic device 600 may also communicate with one or more external devices 800 (such as a keyboard, pointing device, blue tooth device, etc.), may also communicate with one or more devices that enable a user to interact with the electronic device 600, and/or with any device (e.g., router, modem, etc.) that enables the electronic device 600 to communicate with one or more other computing devices. This communication may be performed through an input/output (I/O) interface 650. Moreover, the electronic device 600 may also communicate with one or more networks (such as a local area network (LAN), a wide area network (WAN), and/or a public network, such as the Internet) through the network adapter 660. As shown, the network adapter 660 communicates with other modules of the electronic device 600 through the bus 630. It should be understood that although not shown in the figure, other hardware and/or software modules may be used in conjunction with the electronic device 600, comprising but not limited to: microcode, device drivers, redundant processing units, external disk drive arrays, RAID systems, tape drives and data backup storage systems, and so on.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a U disk, a mobile hard disk, etc.) or on a network, including a number of instructions to make a computing device (which may be a personal computer, a server, a terminal apparatus, or a network device, etc.) to perform the methods according to embodiments in the present disclosure.

In an exemplary embodiment of the present disclosure, there is also provided a computer-readable storage medium on which a program product capable of implementing the above-mentioned method of the present specification is stored. In some possible implementation manners, aspects of the present disclosure may also be implemented in the form of a program product, which includes program code. When the program product runs on a terminal device, the program code is used to make the terminal device perform the steps according to various exemplary embodiments of the present disclosure described in the above-mentioned 'exemplary method' section of this specification.

Figure 7:
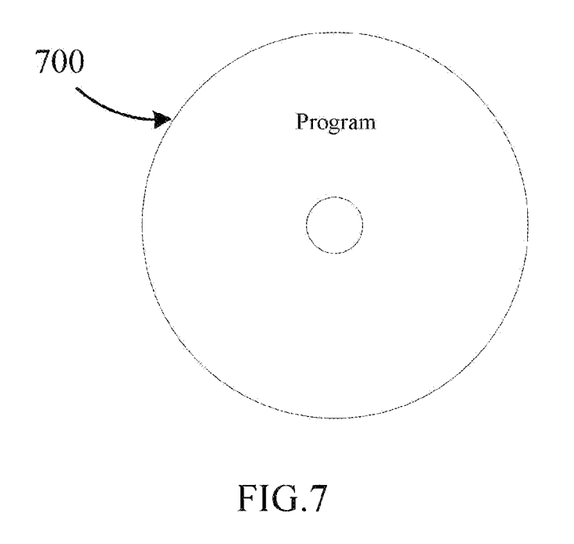
FIG. 7 schematically shows a computer-readable storage medium for implementing the above method in some embodiments.

Referring to FIG. 7, a program product 700 for implementing the above method according to an embodiment of the present disclosure is described. The program product 700 can use a portable compact disc read-only memory (CD-ROM) and include the program code, which may run on a terminal device, for example, a personal computer. However, the program product of the present disclosure is not limited thereto. In this document, the readable storage medium may be any tangible medium containing or storing a program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, comprising but not limited to wireless, wired, optical fiber cable, RF, etc., or any suitable combination of the foregoing.

The program code for performing the operations of the present disclosure may be written in any combination of one or more program design languages, which include object-oriented program design languages, such as Java, C++, etc. and further include conventional procedural program design language, such as 'C' or a similar program design language.

The program code may be executed entirely or partly on the user computing device, may be executed as an independent software package, may be executed partly on the user computing device and partly on the remote computing device, or may be executed entirely on the remote computing device or server. In the case of a remote computing device, the remote computing device may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of processes included in methods according to the exemplary embodiments of the present disclosure, and are not limiting purposes. It is easy to understand that the processes shown in the above drawings does not indicate or limit the chronological order of these processes. In addition, it is also easy to understand that these processes may be performed synchronously or asynchronously in multiple modules, for example.

It should be noted that although several modules or units of the apparatus for action performance are mentioned in the above detailed description, this division is not mandatory. Indeed, according to exemplary embodiments of the present disclosure, the features and functions of two or more modules or units described above may be embodied in one module or unit. Conversely, the features and functions of one module or unit described above may be further divided into multiple modules or units to be embodied.

Other embodiments of the present disclosure will be apparent to those skilled in the art after consideration of the specification and practice of the present disclosure disclosed here. The present application is intended to cover any variations, uses, or adaptive changes of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

It should be understood that this disclosure is not limited to the exact structure described above and shown in the accompanying drawings, and may be subject to various modifications and changes without deviating from its scope. The scope of the disclosure is to be limited only by the appended claims.

What is claimed is:

1. An information sharing chain generation method, comprising:
   in response to shared information being shared among a plurality of nodes, acquiring information of a parent node of a target node, wherein the parent node of the target node is a node that shares the shared information to the target node;
   according to the information of the parent node of the target node, searching for the parent node of the target node in a pre-established information sharing data table, and sequentially searching for information of a previous parent node by taking the searched parent node as a child node; and
   generating a sharing chain of the shared information based on search results.

2. The method according to claim 1, wherein before acquiring the information of the parent node of the target node, the method further comprises:
   in response to that the target node triggers a preset event according to the shared information, acquiring the information of the parent node of the target node.

3. The method according to claim 2, wherein the preset event comprises any one or more of:
   a time of the target node browsing the shared information exceeds a preset time;
   a specific interactive operation is performed by the target node on the shared information;
   a frequency of the target node viewing the shared information exceeds a preset threshold; and
   a number of other nodes to which the target node shares the shared information is greater than a preset number.

4. The method according to claim 1, wherein the information sharing data table is established in following manner:
   in response to that the shared information arrives at each node, taking a node at which the shared information arrives as a current node, and recording a node identification of the current node, a node sharing code of the current node, a parent node identification of the current node, a parent node sharing code of the current node and an identification of the shared information; and
   generating the information sharing data table based on the node identification of the each node, the node sharing code of the each node, the parent node identification of the each node, the parent node sharing code of the each node and the identification of the shared information.

5. The method according to claim 4, wherein the recording the node identification of the current node, the node sharing code of the current node, the parent node identification of the current node, the parent node sharing code of the current node and the identification of the shared information comprises:
   searching for the node identification of a previous node of the current node and treating the node identification of the previous node as the parent node identification of the current node;
   searching for the node sharing code of the previous node of the current node and treating the node sharing code of the previous node as the parent node sharing code of the current node; and
   obtaining the node sharing code of the current node by increasing the parent node sharing code of the current node by 1.

6. The method according to claim 4, wherein the acquiring the information of the parent node of the target node comprises:
   acquiring the parent node identification of the target node, the parent node sharing code of the target node and the identification of the shared information;
   wherein the according to the information of the parent node of the target node, searching for the parent node of the target node in the pre-established information sharing data table, and sequentially searching for information of the previous parent node by taking the searched parent node as the child node comprises:
   according to the identification of the shared information, searching for sharing record information of the shared information in the information sharing data table;
   according to the parent node identification of the target node and the parent node sharing code of the target node, searching for the parent node of the target node in the sharing record information of the shared information, wherein the parent node identification of the target node is same as the node identification of the parent node, and the parent node sharing code of the target node is same as the node sharing code of the parent node;

in response to that the parent node of the target node is searched, treating the parent node as the child node, and sequentially continuing to search for information of the previous parent node by taking the searched parent node as the child node.

7. The method according to claim 6, wherein the generating the sharing chain of the shared information based on search results comprises:

in response to that the information of the searched previous parent node is a null value, generating a sharing chain of target information according to the target node and a relationship between each of searched child nodes and a corresponding parent node.

8. The method according to claim 1, wherein after generating the sharing chain of the shared information, the method further comprises:

according to an attribute of the sharing chain, sending service information corresponding to the attribute to a plurality of nodes in the sharing chain.

9. An electronic device, comprising:

a processor; and a memory for storing executable instructions for the processor;

wherein the processor is configured to in response to shared information being shared among a plurality of nodes, acquire information of a parent node of a target node, wherein the parent node of the target node is a node that shares the shared information to the target node;

according to the information of the parent node of the target node, search for the parent node of the target node in a pre-established information sharing data table, and sequentially search for information of a previous parent node by taking the searched parent node as a child node; and generate a sharing chain of the shared information based on search results.

10. The electronic device according to claim 9, wherein the processor is configured to, in response to that the target node triggers a preset event according to the shared information, acquiring the information of the parent node of the target node.

11. The electronic device according to claim 10, wherein the preset event comprises any one or more of:

a time of the target node browsing the shared information exceeds a preset time;

a specific interactive operation is performed by the target node on the shared information;

a frequency of the target node viewing the shared information exceeds a preset threshold; and a number of other nodes to which the target node shares the shared information is greater than a preset number.

12. The electronic device according to claim 9, wherein the information sharing data table is established in following manner:

in response to that the shared information arrives at each node, taking a node at which the shared information arrives as a current node, and recording a node identification of the current node, a node sharing code of the current node, a parent node identification of the current node, a parent node sharing code of the current node and an identification of the shared information; and generating the information sharing data table based on the node identification of the each node, the node sharing code of the each node, the parent node identification of the each node, the parent node sharing code of the each node and the identification of the shared information.

13. The electronic device according to claim 12, wherein the processor is configured to:

search for the node identification of a previous node of the current node and treat the node identification of the previous node as the parent node identification of the current node;

search for the node sharing code of the previous node of the current node and treat the node sharing code of the previous node as the parent node sharing code of the current node; and obtain the node sharing code of the current node by increasing the parent node sharing code of the current node by 1.

14. The electronic device according to claim 12, wherein the processor is configured to:

acquire the parent node identification of the target node, the parent node sharing code of the target node and the identification of the shared information;

according to the identification of the shared information, search for sharing record information of the shared information in the information sharing data table;

according to the parent node identification of the target node and the parent node sharing code of the target node, search for the parent node of the target node in the sharing record information of the shared information, wherein the parent node identification of the target node is same as the node identification of the parent node, and the parent node sharing code of the target node is same as the node sharing code of the parent node;

in response to that the parent node of the target node is searched, treat the parent node as the child node, and sequentially continue to search for information of the previous parent node by taking the searched parent node as the child node.

15. The electronic device according to claim 14, wherein the processor is configured to:

in response to that the information of the searched previous parent node is a null value, generate a sharing chain of target information according to the target node and a relationship between each of searched child nodes and a corresponding parent node.

16. The electronic device according to claim 9, wherein the processor is further configured to:

according to an attribute of the sharing chain, send service information corresponding to the attribute to a plurality of nodes in the sharing chain.

17. A non-transitory computer-readable storage medium having a computer program stored thereon, wherein, when the computer program is executed by a processor, an information sharing chain generation method is implemented, wherein the information sharing chain generation method comprises:

in response to shared information being shared among a plurality of nodes, acquiring information of a parent node of a target node, wherein the parent node of the target node is a node that shares the shared information to the target node;

according to the information of the parent node of the target node, searching for the parent node of the target node in a pre-established information sharing data table, and sequentially searching for information of a previous parent node by taking the searched parent node as a child node; and generating a sharing chain of the shared information based on search results.

* * * * *